US008725590B2

(12) United States Patent
Lipscher et al.

(10) Patent No.: US 8,725,590 B2
(45) Date of Patent: May 13, 2014

(54) METHODS AND SYSTEMS FOR GENERATING CUSTOMIZED USER PLANS

(75) Inventors: Randolph Lipscher, Albuquerque, NM (US); Thomas Estermyer, Albuquerque, NM (US); Marc Falzon, Albuquerque, NM (US); Michael Gerrity, Albuquerque, NM (US)

(73) Assignee: LookingNew, Inc., Albuquerque, NM (US)

( * ) Notice: Subject to any disclaimer, the term of this patent is extended or adjusted under 35 U.S.C. 154(b) by 80 days.

(21) Appl. No.: 13/371,432

(22) Filed: Feb. 12, 2012

(65) Prior Publication Data

US 2013/0211948 A1   Aug. 15, 2013

(51) Int. Cl.
*G06Q 30/00* (2012.01)

(52) U.S. Cl.
USPC .............................. 705/26.5; 705/26.1; 705/2

(58) Field of Classification Search
USPC .................................... 705/26.1, 27.1, 2, 26.5
See application file for complete search history.

(56) References Cited

U.S. PATENT DOCUMENTS

| | | | |
|---|---|---|---|
| 6,146,148 A | 11/2000 | Stuppy | |
| 6,944,624 B2 | 9/2005 | Orton et al. | |
| 6,988,088 B1 * | 1/2006 | Miikkulainen et al. | 706/14 |
| 7,361,143 B2 * | 4/2008 | Kirchhoff et al. | 600/300 |
| 7,756,753 B1 | 7/2010 | McFarland | |
| 8,275,635 B2 * | 9/2012 | Stivoric et al. | 705/3 |
| 2001/0043364 A1 | 11/2001 | Messner et al. | |
| 2003/0204412 A1 * | 10/2003 | Brier | 705/2 |
| 2004/0162702 A1 | 8/2004 | Pandipati et al. | |
| 2006/0004603 A1 * | 1/2006 | Peterka et al. | 705/2 |
| 2006/0074279 A1 | 4/2006 | Brover | |
| 2006/0085217 A1 * | 4/2006 | Grace | 705/1 |
| 2006/0199155 A1 | 9/2006 | Mosher | |
| 2008/0162186 A1 | 7/2008 | Jones | |
| 2009/0132284 A1 * | 5/2009 | Fey et al. | 705/3 |
| 2009/0144081 A1 | 6/2009 | Harlan | |
| 2010/0042438 A1 * | 2/2010 | Moore et al. | 705/3 |
| 2010/0179027 A1 * | 7/2010 | McGlynn et al. | 482/9 |

OTHER PUBLICATIONS

Wellness; myMediConnect Launches Enhanced Wellness Tracker, an Online Dietician and Personal Trainer, Obesity, Fitness & Wellness Week, Dec. 25, 2010: 1638.*

* cited by examiner

*Primary Examiner* — Jeffrey A Smith
*Assistant Examiner* — Anne Georgalas
(74) *Attorney, Agent, or Firm* — Kilpatrick Townsend & Stockton, LLP

(57) ABSTRACT

A computer-implemented method for generating a customized user plan based on corresponding creator plans and user data. The creator plans is generated by experts in their respective fields, by businesses, and by users of the system. The creator plans is available for selection or purchase by users. A system may propose creator plans to a user. Once the one or more creator plans are identified for a particular user, the system generates a customized user plan based on these creator plans and corresponding user data, such as user input, user state, and privacy settings. External data and other plans of this and other users may also be used in generating the customized user plan. A single customized user plan may integrate multiple creator plans and set multiple goals for the user. The user plan may be dynamically generated and updated based on, for example, changes to the user data.

29 Claims, 11 Drawing Sheets

METHODS AND SYSTEMS FOR GENERATING CUSTOMIZED USER PLANS

FIELD

This application relates generally to generating customized user plans and more specifically to computer-implemented systems and methods for generating customized user plans using creator plans, as well as user input, user state, and privacy settings.

BACKGROUND

Planning is a process for accomplishing specific goals. Goals and types of plans may vary depending on the planners and the people trying to accomplish the goals. Plans may vary from a simple recipe to a complex business scheme. A plan may be viewed as a blueprint for personal or organizational growth and a road map for such development. A plan helps in defining objectives both in quantitative and qualitative terms, accounting for available resources, and other factors.

Just as no two people or organizations are alike, their plans are also not alike. It is, therefore, important to prepare a plan that keeps in mind the necessities of the person or enterprise. A plan is an important aspect of a human life or business. One may view the entire life of a person or a lifecycle of an organization as multiple plans executed over a time period. Plans may be repeated many times (e.g., cooking according to the same recipe) or overlap with other plans (e.g., losing weight while, at the same time, looking for a new house) and may affect or conflict with each other.

Some plans are carefully prepared, for example, after conducting extensive research and analysis. Others plans are improvised. While careful preparations may be valuable, such preparations may take a significant amount of time and other resources, which could be otherwise used for execution of the plans and achieving the set goals. Furthermore, many people involved in planning may not have sufficient knowledge and expertise to develop a correct plan. Even a seemingly simple goal of losing weight may be overcomplicated by health history, knowledge of diet and exercise routines, the availability of exercise equipment, time management, and other factors. On the other hand, offhand plans may be misguided and lead to incorrect results. Planning is further complicated when a person or organization tries to generate or execute multiple plans simultaneously. For example, multiple plans may compete for the same resources (e.g., person's time or finances).

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are computer-implemented methods and systems for generating user specific plans based on corresponding creator plans and user data. The creator plans may be generated by experts in their respective fields, by businesses, and even by users. The creator plans may be available for selection and, in certain embodiments, for purchase by users. A system may suggest certain creator plans to a user. Once the one or more creator plans are identified for a particular user, the system may generate a customized user plan based on these creator plans and corresponding user data, such as user input, user state, and privacy settings. External data and other plans of this and other users may be also used during generation of the customized user plan. One customized user plan may integrate multiple creator plans and have multiple goals for the user. The customized user plan may be dynamically generated and updated based, for example, on changes to user data.

In certain embodiments, a computer-implemented method may involve retrieving the one or more creator plans based on one or more of the following: a user selection of the one or more creator plans, another system user's selection of the one or more creator plans, selection of the one or more creator plans, user data, and external input. The method may also involve retrieving the user input, user state, and privacy settings associated with the user. The method may then continue with generating the customized user plan based on integration of the one or more retrieved creator plans with the user input, user state, and privacy settings. The generated customized user plan includes a set of instructions to be executed by the user. The method may proceed with presenting the customized user plan to the user and receiving one or more responses from the user about completing one or more instructions from the set of instructions.

In certain embodiments, failure by the user to respond to the presented customized user plan may be considered a response that may further be acted upon automatically by the system, or by the designated system user with appropriate clearance (e.g., a system operator).

In certain embodiments, the computer-implemented method also involves updating the customized user plan based on the one or more responses received from the user and presenting the updated customized user plan to the user. Updating may be also performed based on changes to the user input, user state, and privacy settings associated with the user in addition to, or instead of, the responses received from the user. In certain embodiments, generating the customized user plan may involve adding external data to the combination of the data originally provided in the creator plan and user input, user state, and privacy setting associated with the user. Examples of the external data may include an advertisement, a product placement, weather data, a government health database of food nutrition, and a current mortgage interest rate. In the same or other embodiments, a plan is generated based on other user data in addition to the user input, user state, and privacy settings associated with the user. Examples of other user data may include a relationship of the user with another user or group, success in implementing one or more creator plans by one or more other users, and one or more related plans. For example, a user plan may be profiled after another plan previously used by a friend of the user. In another example, successful implementation of one plan may result in automated generation of another plan.

In certain embodiments, the computer-implemented method may also involve generating the one or more creator plans based on input from one or more plan creators. The input from the one or more plan creators may be provided using a plan creation tool, which may be an online web-based application.

In certain embodiments, the computer-implemented method may also involve collecting a fee from the user based on the user selection of the one or more creator plans. In the same or other embodiments, the computer-implemented method may involve providing a credit to the user based on user selection of one or more promotions. For example, a creator plan may have a certain fee associated with the selection and usage of the creator plan for the generation of the customized user plan. The user may choose to pay this fee.

Alternatively, the user may participate in certain promotions (e.g., signing up for a gym membership or purchasing a certain product) that may offset part of or the entire fee associated with the selected creator plan.

In certain embodiments, the computer-implemented method also involves presenting multiple creator plans to the user and receiving the user selection of one or more creator plans. Presentation of the multiple creator plans may involve presenting one or more evaluations corresponding to the multiple creator plans. Examples of the evaluations may be various forms of ranking of the plan itself or of the creator of the plan. Other examples include feedback by users, metrics associated with the popularity and success of the creator plans, and other forms of evaluations.

In certain embodiments, the computer-implemented method also involves suggesting the one or more creator plans to the user based on the user data or external input. For example, user data may indicate certain health conditions of the user, his or her financial state, time availability, social network, and other information that may be used to suggest creator plans. In the same or other embodiments, generating the customized user plan involves integration of the multiple creator plans with the user input, user state, and privacy settings associated with the user. As such, the multiple creator plans may lead to a single customized user plan, which may still have multiple goals. This integration may help to avoid user confusion when attempting to follow multiple customized user plans simultaneously. Furthermore, various synergistic effects may be found during integration of the multiple creator plans.

In certain embodiments, the computer-implemented method also involves collecting the user input, user state, and privacy settings associated with the user. This operation may be performed using a set-up wizard. Furthermore, this information may be periodically updated or automatically collected by the system and, in certain embodiments, used to dynamically update the existing customized user plans or to suggest new plans. In certain embodiments, the computer-implemented method also involves collecting additional information corresponding to user input, user state, or privacy settings associated with the user based on the selection of the one or more creator plans by the user. For example, generating the customized user plan based on the selected creator plan may require additional data that was not previously available (e.g., current weight for a weight loss plan).

In further examples, the above steps of the method proposed herein are stored on a machine-readable medium including instructions, which, when implemented by one or more processors, perform the steps. In yet further examples, subsystems or devices can be adapted to perform the recited steps. Other features, examples, and embodiments are described below.

BRIEF DESCRIPTION OF DRAWINGS

Example embodiments are illustrated by way of example and not limitation in the figures of the accompanying drawings, in which like references indicate similar elements and in which.

DETAILED DESCRIPTION

Figure 1:
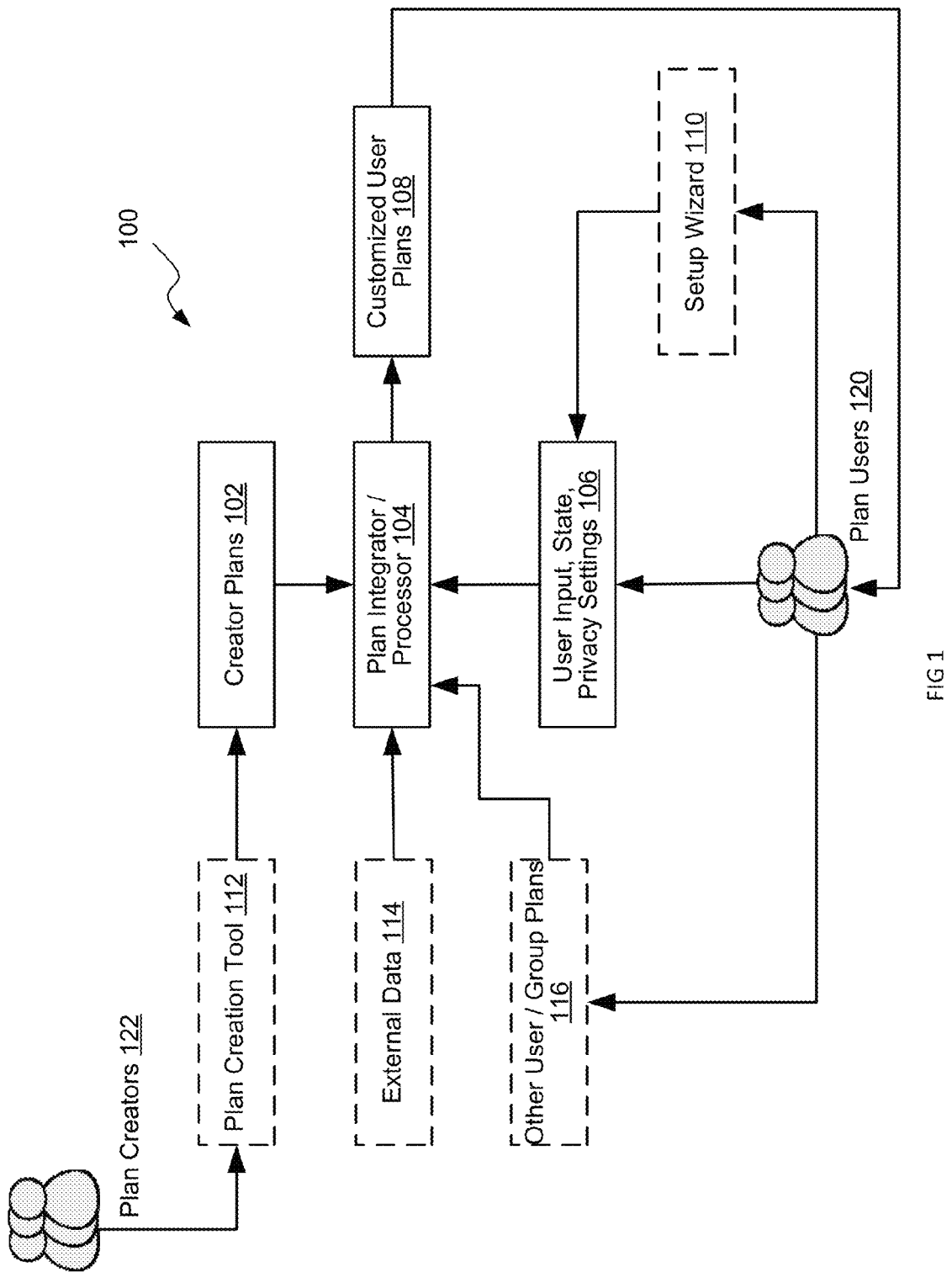
FIG. 1 illustrates a schematic overview of various modules of the system for generating customized user plans based on the one or more creator plans, in accordance with certain embodiments.

Example systems and methods for generating customized user plans are described. In the following description, for purposes of explanation, numerous specific details are set forth in order to provide a thorough understanding of the example embodiments. It will be evident, however, to one skilled in the art, that the present technology may be practiced without these specific details.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Many aspects of life involve planning. For example, a person may set a goal of losing a certain amount of weight. The person may then develop a set of steps, such as dieting and exercising, to achieve this goal. The related planning may be a rather laborious process involving some research of diets, exercise routines, understanding their health conditions, and determining any other factors. To simplify the process, people often make assumptions and ignore certain factors. This, in turn, may cause the plan to be unreliable or unrealistic. For example, the weight loss plan described above may require unreasonable time commitment from the person.

Oftentimes, many components or factors used in developing one plan may be used for creating another plan. In the above weight loss example, a dieting component may include a list of recommended food items. This list may be used to create a shopping plan (e.g., a shopping list), a cooking plan (e.g., various recipes using these food items), a financial budget plan (e.g., an estimate of expenses associated with purchasing these food items), and so on.

The proposed methods and systems involve a process of dynamic generation of a customized plan based on a collection of creator plans and based at least on user specific data Other data, such as the external data and plans from other users, may be used for generating a customized user plan as well. In certain embodiments, a user may be a representative of a group of users who acts on behalf of the group and makes a selection of the creator plan for all members of the group, for example, a platoon leader may make a selection of the creator plan for his platoon. The system may include one or more websites or applications for desktops, tablets, smartphones, and other types of computer systems and client devices. These websites or applications are accessed by the plan creators to create their creator plans, while users access the websites or applications to provide various inputs, states, privacy settings, and other information, as well as to retrieve the customized user plans generated by the system. The customized user plans are built based on the creator plans but are generally different from the creator plans. For example, the system may generate two different customized user plans based on the same creator plan. As different user inputs, states, and other information were used to generate these two customized user plans, the resulting customized user plans may be quite different from each other. In the above weight loss example, the customized user weight loss plan for one user may be focused more on dieting, while the customized user plan for another user may be focused more on exercising. Both customized user plans may be generated based on the same creator plan. While the creator plan may serve as a basis for the customized user plan, it is tailored to take into account the various factors of a specific user. The customized user plans are dynamically generated for each specific user based on such data and may represent a comprehensive version of multiple plans (e.g., a combination of a weight loss program, social networking, and financial planning). For example, a group of friends may be involved in the same exercise plan in order to emotionally support one another and save on fitness instructions and equipment costs.

The creator plans may include a range of free and paid customizable plans that can direct and assist users in improving all aspects of their life, such as health, well-being, personal and professional success, and overall life goals. The creator plans may be submitted into the system by various professionals in corresponding fields and even by other system users. For example, a nutritionist may provide diet plans to achieve various goals, such as weight loss, controlling disease (e.g., diabetes), and others. A real estate broker may submit a plan for saving a down payment for a house, a separate plan for obtaining a mortgage, and yet another plan for finding and purchasing a house. In certain embodiments, these real estate plans may be integrated with each other by the plan creator, by the user, or by the core integrator. Plan creators may help users in complicated environments. Users are not expected to recognize and analyze all aspects in each event or situation they encounter, and they generally do not have the resources to do so. Reviews or verifications of the expertise or credentials of the plan creators may be made available to users. Furthermore, users may contribute to the reviews of the experts or of their plans. In certain embodiments, the system may rank the creator plans based on their popularity, success (e.g., how many users have reached the set goals), and other criteria. The systems and methods may also provide a plan creation tool, which may be a web-based tool, used by the plan creators to design and build the various creator plans encompassing various aspects of their particular expertise. The plan creators may post ongoing updates to their creator plans, which may be made available automatically to users of those creator plans or, more specifically, to update the customized user plans that are based on the modified creator plans.

The customized user plan is a set of instructions, which, through the functionality of the system, may guide a user in accomplishing a specific task or assist the user in reaching a desired specific or general goal. The internal structure of the customized user plan may be of many forms. For example, instructions of the customized user plan may be organized chronologically. In the same or other embodiments, instructions may be grouped into a series of steps or sub-goals. The customized user plan may be generated dynamically, which means that the instructions provided in the plan may not only be specific to the user's initial input but they may also change and adapt based on changes to the user's profile, preferences, associations, actions, feedback, and ongoing results from this and other plans the user is following. For example, a weight loss plan may account for the previous meals consumed by the user, his or her feelings (e.g., sad, energetic, sleepy), weather (e.g., sunny, rainy), and other variables.

The creator plans may be made available to users through the plan store, which may be part of the user interface. The plan store may allow users to browse and search various types of creator plans pertinent to their desired goals. The plan store may also guide users in selecting the creator plans that would be of interest to them or that may be beneficial to their overall or specific goals. In certain embodiments, the plan store may present semi-customized or fully-customized versions of the creator plans to users. In certain embodiments, a fully-customized version of the creator plan may be considered as the customized user plan. Thus, the plan store may offer the customized user plans in addition to, or instead of, the creator plans.

In certain embodiments, the newly created creator plans may be stored within a plan library. To select plans that meet some predefined criteria and can be used for a specific plan user or user group, the creator plans within the plan library may be filtered by a plan filterer using a plan filtering tool. The plan filtering tool or the plan filterer may be a plan user him- or herself, another system user (for example, a designated system user with appropriate clearance (herein also referred to as a system operator)), or a software application that will perform the filtering based on the predefined criteria. After the creator plans that meet the specified predefined criteria are located, they may be placed into a filtered plan library/plan store, thus becoming available for selection by a plan chooser.

In certain embodiments, the filtered creator plans that are found in the filtered plan library/plan store may be chosen by the plan chooser using a plan selection tool. The plan chooser may be the plan user him- or herself, another system user (for example, the designated system user with appropriate clearance (system monitor)), or a software application that will perform the selection process based on the predefined criteria.

In certain embodiments, the one or more chosen creator plans that have been retrieved from the filtered plan library/plan store may be modified by a plan modifier using a plan modification tool. The plan modifier may be the plan user him- or herself, another system user, for example, the designated system user with appropriate clearance (e.g., a system operator). It will be understood that the plan modifier is not limited to a human and may, in some embodiments, include a computer system, a computer script, or an automated device.

In certain embodiments, the plan creator, plan filterer, plan chooser, and plan modifier may be one and same or disparate persons, one and the same or disparate software applications, or a combination thereof. For example, the plan creator may be a system user other than the plan user that the creator plan is intended for, while the plan filterer may be a specifically designed software application that may or may not also be able to play the role of the plan chooser.

In certain embodiments, the creator plan may be modified by the plan modifier to include the executed customized user plans, or parts thereof, of this or other plan user or users. In certain embodiments, the customized creator user plan may be modified based on the one or more actions that have been taken by the plan user in response to one or more system messages. In certain embodiments, the plan user may be notified by the system that a certain planned action has not been performed by him or her. This may be done using a timer. The plan user may then be requested to perform the missed planned action and to provide a corresponding input, based on which the customized user plan may be considered as executed.

In certain embodiments, the customized user plans may be rendered available for monitoring by other system users. In certain embodiments, the customized user plans may be adjusted or modified by the designated system users with relevant clearance (system monitor). For example, if a hospital patient has not taken an important prescribed medication for a while, the system monitor may modify the customized user plan of this hospital patient so as to notify him or her about the need to immediately present him- or herself at the doctor's office.

In certain embodiments, monitoring of the fulfillment of the one or more customized user plans, as well as these plans' cancellations, may be performed using a plan monitoring module. In certain embodiments, the system may notify the one or more system monitors about the failure on the part of the user to perform an action the customized user plan of the plan user comprises. In certain embodiments, the system monitor may instruct the system to generate a message and send it to another system user or external recipient (for example, by email), thereby informing the recipient of the message about, or requesting him or her to take some action with regards to, the situation at hand. For the above purpose, a set of predefined, customizable system messages may be used.

In certain embodiments, the system may comprise an internal social network. The information that the plan user submits into the internal social network may be used by the plan integrator/processor/expert system in creating new customized user plans, as well as for modifying the current and executed customized user plans.

In certain embodiments, the creator plan may be chosen for the plan user by another user of the system. For example, a teacher may choose the suitable creator plan for a student, sharing it with him or her through the system. The multiple creator plans may be chosen for the plan user by another user or the software application just as well, with the goal of narrowing down the scope of user selection while taking the plan user's preferences or special needs into account. The plan user may then choose from the given selection of the creator plans. This may be especially useful when the multiple creator plans to choose from are allocated to a specific user group.

In certain embodiments, the one or more creator plans chosen for the plan user by another user of the system may be accompanied by the latter's comments, for example, in the form of recommendations or instructions on how the customized user plan to be generated based on the chosen creator plan. In certain embodiments, the current customized user plans may be rendered reviewable to the designated system user with relevant clearance (system monitor) and commented on by the latter. The system may notify the plan user about his or her plan having been commented on, including a notification by email. In certain embodiments, the creator plans may be automatically filtered by a software application based on some predefined criteria.

In certain embodiments, the current customized user plan may be cancelled by the designated system user with relevant clearance (system monitor). In certain embodiments, the creator plan or plans, chosen by the plan user for him- or herself, or chosen by another system user or a software application for this plan user, may be cancelled by the designated system user with relevant clearance (system monitor). In certain embodiments, the system may be able to notify the plan user for whom the cancelled creator plan was intended, and, in the same or other embodiments, may notify the plan user who chose this creator plan about the plan having been cancelled. The designated system user with relevant clearance (system monitor) who has cancelled the creator plan may be able to indicate the reason for the cancellation using a set of predefined, customizable messages.

In certain embodiments, the system may notify the designated system user with relevant clearance (system monitor) when the multiple creator plans are allocated to a group of system users to choose from. In this or other embodiments, the designated system user with relevant clearance (system monitor) may cancel the above selection, thereby notifying the plan user by whom the decision about the cancellation was made. The designated system user with relevant clearance (system monitor) may be able to add his or her comments to the cancellation notification, sent to the system user by whom the selection was made. Such cancellation notifications may be sent via the system or by email.

In certain embodiments, the plan user may be able to share the one or more chosen or allocated creator plans, or the one or more executed customized user plans, with other users of the system or specific user groups, accompanying the creator plans with his or her comments. The designated system user with relevant clearance (system monitor) may be able to receive notifications about the one or more creator plans or executed customized user plans being shared, and approve or disapprove of the sharing procedure, therein stating the reason for his or her decision. In this or other embodiments, the one or more creator plans, or the one or more executed customized user plans may be shared using the internal social network of the system.

In certain embodiments, the system may enable the plan user to identify other system users with similar current or executed customized user plans. In particular, this may be useful for enabling comment exchange and sharing of related advice in the system's internal social network. In certain embodiments, this function may be supervised/regulated by the designated system user with relevant clearance (system monitor). In certain embodiments, the customized user plan may contain links to, or be otherwise associated with, media of different types (for example, it may contain links to a video hosted by a public file sharing system). In certain embodiments, the customized user plan may contain links to web resources that provide relevant content. In certain embodiments, multiple types of system monitors with varying authority may be supported.

FIG. 1 is a schematic representation of the system 100 for generating the customized user plans 108 based on the corresponding creator plans 102 and additional data, in accordance with certain embodiments. Two types of participants in system 100 may include plan users 120 and plan creators 122. The plan users 120 may utilize the customized user plans 108 generated by system 100, while the plan creators 122 may generate or, more generally, provide the creator plans 102 to the system 100. In certain embodiments, the same person may be both the plan user 120 and the plan creator 122.

The creator plans 102 may typically be different from the customized user plans 108 and may be used by the plan integrator/processor/expert system 104 to generate the customized user plans 108. Additional data, such as user input, state, privacy settings (collectively represented by a block 106), the external data 114, and plans by other users or user groups (collectively represented by block, 116) may be used by the plan integrator/processor/expert system 104 to generate the customized user plans 108. Each of these components and corresponding examples will now be described in more detail.

The plan creators 122 may utilize a plan creation tool 112 to develop the creator plans 102. Specifically, the plan creators 122 may submit various instructions, criteria, goals, and other data through the user interface of the plan creation tool 112. The plan creation tool 112 may include a graphical user interface. The plan creation tool 112 may contain a plan integrator/processor of its own to assist the plan creators 122 with generating the creator plans. In other embodiments, the plan creation tool 112 or the plan integrator/processor/expert system 104 may be used by the plan creators 122 for this purpose. The plan integrator/processor/expert system 104 may be used to simulate creation of the customized user plans 108 based on the creator plans 102 as the creator plans 102 are developed or generated. In certain embodiments, the plan creation tool 112 may automatically generate new creator plans 102 based on previously generated creator plans 102, or based on various inputs from the plan users 120.

The creator plans 102 may be algorithms that are used by the plan integrator/processor/expert system 104 to generate the customized user plans 108. In certain embodiments, the creator plans 102 include data provided by the plan creators 122, by the plan creation tool 112, or by other sources. The creator plans 102 may be generated by the plan creation tool 112, or by using some other facilities. The creator plans 102 may be stored in an electronic form (for example, in a database associated with the system 100 and further described below with reference to FIG. 2).

The creator plans 102 may include instructions that are chronologically sequential or non-sequential. In certain embodiments, the order of instructions in the creator plan is different from the order of instructions in the corresponding customized user plan generated based on the aforementioned creator plan. In the same or other embodiments, not all instructions from the creator plan may be used in the corresponding customized user plan. Some of the instructions appearing in the one or more creator plans may be rearranged or removed during user generation based on user-specific and other data. The instructions or steps in the customized user plans 108 or creator plans 102 may be grouped into sub-sets with specific sub-goals corresponding to one or more of these sub-sets.

Some specific examples of creator plans 102 may include a diabetes plan created by the Mayo Clinic in Rochester, Minn., an exercise plan created by an aerobics or yoga instructor, and a plan created by a certified financial planner directing a user in how to purchase a house (e.g., more specifically, his first house). Other types of creator plans 102 may be used as well. Some creator plans 102 may be created by the system based on various inputs to the system. For example, the system 100 may utilize the existing creator plans 102 to generate the new creator plans 102. User feedback may be relied on to modify the existing creator plans 102, or generate new creator plans 102. In certain embodiments, the system 100 may be coupled with a web crawler to search for additional information or instructions for existing plans and even for fulfilled plans.

Some creator plans 102 may be offered to the plan users 120 for a fee. Other plans may be offered free of charge. In certain embodiments, the fee for the plan is determined based on the various feedback received from the plan users 120, such as the plan users' success in using one or more of the plans, the users' satisfaction with their user experience, and other factors.

The creator plans 102 may have one or more characteristics associated with the plans and may be used, in certain embodiments, for presenting these creator plans to the plan users 120. For example, the plan users 120 may be made aware of the identity of the plan creators 122 or, more specifically, they may be informed about their reputation, credentials, feedback, and other relevant information.

In order to generate a customized user plan 108, the integrator/processor/expert system 104 may use the one or more creator plans 102 selected by the user, or otherwise submitted to the integrator/processor/expert system 104, as well as the user input, user state, and user privacy settings, which are collectively shown as block 106 in FIG. 1. The user input is defined as data created by the one or more users or user groups during the course of their interactions with the system. Examples include specific user feedback, (e.g., a user indicating that he or she is feeling depressed after following a specific diet plan for a while), given in response to prompts by the integrator/processor/expert system 104, and submitted by the user to the integrator/processor/expert system 104, or to other recipients, and indirect responses (e.g., someone in the social network indicates a preference that indirectly affects the user). The user state is defined as a set of user-associated data stored in the system, which may be generated by the user and submitted directly to the system. The user-associated data may also be submitted to the system indirectly, or generated by other users. The user state generally reflects the user's past, current, and predicted future state. The prediction of future user states may be performed by the integrator/processor/expert system 104, or by using other facilities. An example of a past user state may be an indication that the user has felt depressed previously. An example of a current user state may be the fact that the user now weighs 220 pounds. An example of a predicted future state may be the fact that integrator/processor/expert system 104 has predicted that the user will be happy because his or her birthday is this upcoming weekend. This information/prediction may be submitted by other users.

Data corresponding to the user state may also include various biometric data. Examples of biometric data include fingerprints, face recognition, Deoxyribonucleic Acid (DNA), palm prints, hand geometry, iris recognition, and scent. Biometric data may also include various characteristics related to the behavior of a person, such as typing rhythm, gait, and voice. The system 100 may interface with various hardware monitoring devices, such as Global Positioning System (GPS) units, heart-rate monitors, accelerometers used for exercise, wireless weight/health monitors, and others. Data provided by these devices may be received and processed by the integrator/processor/expert system 104 when the customized user plan is being devised.

The user input, user state, and user privacy settings may be collected using a setup wizard 110. The setup wizard 110 may provide a set of questions to which the user will respond. These questions may be dynamically generated by the integrator/processor/expert system 104 to facilitate the collection of user data and, in certain embodiments, the creation of a user profile and user preferences in the system 100. The setup wizard 110 may also function to assist the user in selecting the creator plans 102. The initial input provided by a user (e.g., using the setup wizard 110) may be supplemented by other inputs from the user and other sources. These other sources may provide external data 114 and the plans of other users or user groups 116.

External data 114 is defined as data generated outside the system 100. Some examples of external data 114 include commercial advertisements, product placements, current weather data, a government health database of food nutrition, and current mortgage interest rates. The system 100 may include specifically designed web crawlers that retrieve the needed external data from other sources. The web crawlers may be automatically generated based on various parameters provided in the creator plans 102. The external data 114 may be used to dynamically adjust the customized user plans. For example, if the system 100 determines that a geographical area of a particular user has bad or good weather, it may dynamically adjust the exercise routine based on this information.

The integrator/processor/expert system 104 may be a standard system processor, which receives inputs from various other modules shown in FIG. 1, such as the creator plans 102 and user input, state, and privacy settings (block 106). The inputs of the external data 114 and plans of other users or user groups 116 are optional as shown by the dashed line in FIG. 1. The integrator/processor/expert system 104 then uses such inputs to create a unique or non-unique output in the form of the customized user plan. As stated above, the integrator/processor/expert system 104 may use multiple creator plans to generate a single customized user plan. This process may be referred to as integration of the multiple creator plans and involves creating a set of steps to achieve multiple goals.

The customized user plan 108 represents an output of the system 100 that may contain one or more system-generated algorithms. These algorithms may be chronologically sequential or non-sequential, and they may contain aspects and elements of the multiple plans that the user is following. The non-sequential algorithm simply includes a list of tasks that need to be solved in any order to achieve a result. The non-sequential algorithm may contain sequential or non-sequential elements. The sequential algorithm may introduce an order in which the tasks are to be solved. The sequential algorithm may also include intermediate goals and may require that the user repeats certain tasks. Similarly, the sequential algorithm may contain sequential or non-sequential elements.

The customized user plans 108 may be dynamically generated. That means that if a change is made to inputs used for generating the customized user plan, this change may also initiate adjustment of the plan. Furthermore, subsequently acquired new data that was not available during the generation of the plan may be used to update the plan.

The customized user plans 108 may be generated from multiple sources, with the creator plan being one of these sources. Multiple creator plans may be used. For example, if the user wishes to follow an anti-cancer plan and a weight loss plan concurrently, the integrator/processor/expert system 104 may output a daily diet (i.e., the customized user plan) that contains foods appropriate to both plans.

The generation and updating of the customized user plans 108 may be based on the user's social network or his or her status. For example, the system 100 may rely on the social connections of the user to suggest a support system, organize events, and other functions. The status information may be used to determine the time availability, emotional status, and other factors pertinent to the generation and updating of the customized user plans 108.

The customized user plans 108 may contain some or all of the elements of the creator plans 102. The customized user plans 108 may also contain the external data 114 and other data. For example, the creator plan 102 may set a goal for the user to lose 20 pounds and then, if the goal is achieved, it may set up a celebration party. When the integrator/processor/expert system 104 determines that the goal is met, it outputs another customized user plan, or modifies the existing one to congratulate the user on his or her accomplishment while also recommending some specific venues and activities for the celebration. The integrator/processor/expert system 104 may then retrieve certain data from the user input or state to determine the user's preferences. It may be determined that the user dislikes Middle-Eastern food but likes Italian food. In response, the integrator/processor/expert system 104 would refrain from suggesting a Lebanese restaurant for the party, and may instead conduct a search for Italian restaurants in the area.

Figure 2:
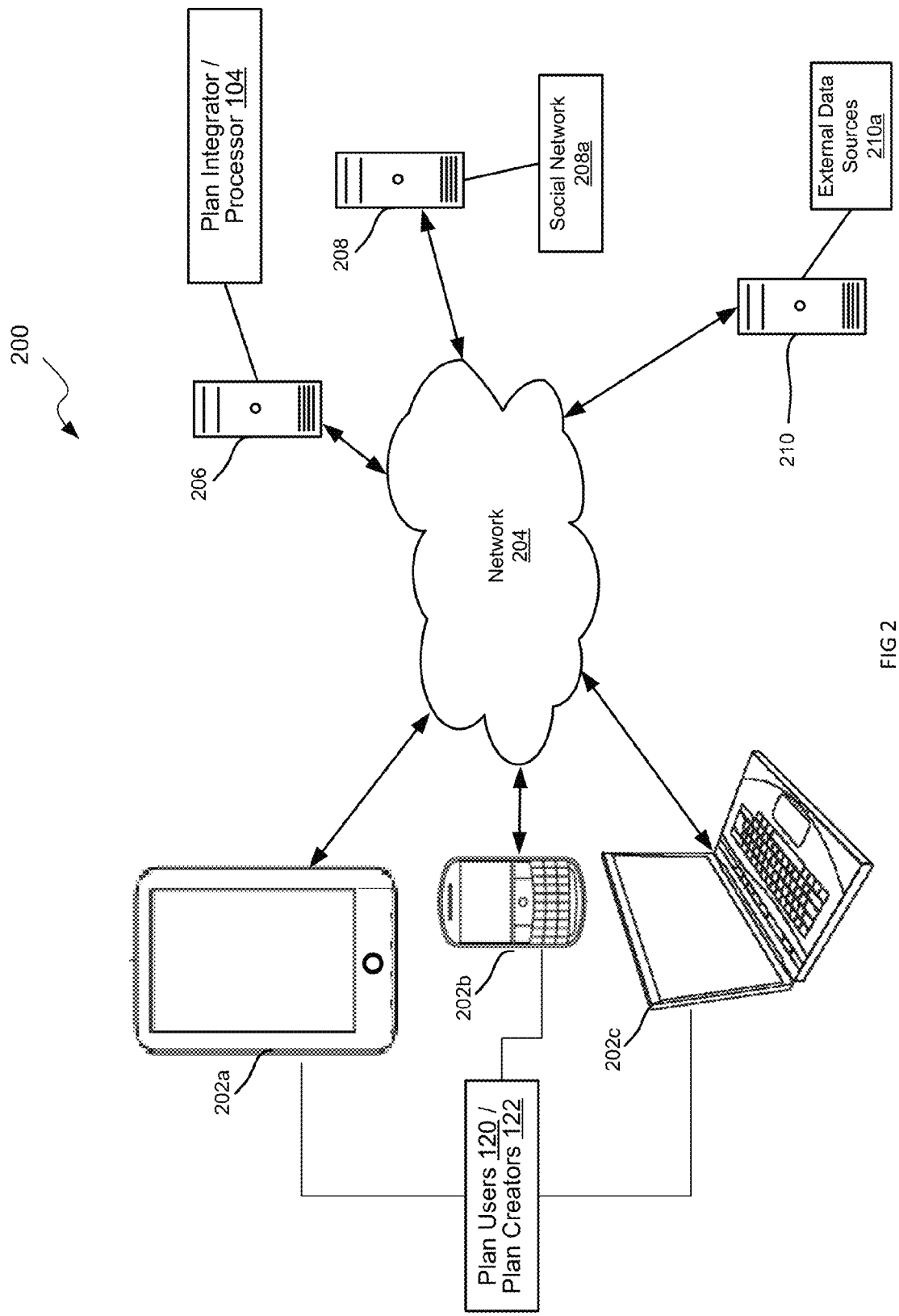
FIG. 2 illustrates an example network segment for implementing various aspects of methods and systems for generating customized user plans based on the one or more creator plans, in accordance with certain embodiments.

Before describing the various methods and associated operations, a brief description of a computer network is in order. Specifically, FIG. 2 illustrates an example network segment 200 for implementing various aspects of methods and systems for generating the customized user plan based on the one or more creator plans, in accordance with certain embodiments. Multiple computer systems 202a, 202b, 202c may be used by the plan users 120 or plan creators 122 for connecting to a plan generation server 206, as well as to other servers via the network 204. In certain embodiments, the one or more computer systems 202a, 202b, 202c may include a plan creation tool or setup wizard, as described elsewhere in this document. The one or more plan creation tools or setup wizards may be downloaded to the computer systems 202a, 202b, and 202c from the plan generation server 206. In other embodiments, they may be provided in the online web-based format and the computer systems 202a, 202b, 202c may be connected to a plan generation server 206 via the network 204 to use various functions of these applications. Various examples and features of the computer systems 202a, 202b, and 202c are described below with reference to FIG. 11.

The plan generation server 206 may be accessed by one of the computer systems 202a, 202b, 202c to generate the creator plans, or customized user plans. In certain embodiments, different servers are used for these two operations. The plan generation server 206 is also used to collect various data, such as use data, external data, and data pertaining to other plans. The various plans and data may be stored in one or more databases associated with the plan generation server 206. The plan generation server 206 may also include or be attached to the plan integrator/processor/expert system 104.

The plan generation server 206 may be also connected to the social network server 208 hosting the social network 208a. The social network server 208 may provide various degrees of access to data available from the social network 208a. This data may be provided by users 120 using the computer systems 202a, 202b, and 202c connected to the social network server 208. In certain embodiments, the social network 208a and plan integrator/processor/expert system 104 are parts of the same system and may be provided by a shared service.

The plan generation server 206 may also be connected to various external data servers 210 hosting various external data sources 210a. Various examples of the external data are provided above. The plan generation server 206 may retrieve the external data from the external data servers 210 to generate and update the customized user plans.

The network 204 may be also used for communication among various components of the plan generation system. The network 204 may take any suitable form, such as a wide area network (WAN), Internet, or one or more local area networks (LANs). The network 104 may include any suitable number and type of devices (e.g., routers and switches) for forwarding commands, content, or web object requests from each client to the online community application, as well as for sending responses to the clients.

The methods described herein may also be practiced in a wide variety of network environments (represented by network 204) including, for example, Transmission Control Protocol/Internet Protocol (TCP/IP)-based networks, telecommunications networks, wireless networks, and so forth. In addition, the computer program instructions may be stored in any type of computer-readable media. The program may be executed according to a variety of computing models, including a client/server model or a peer-to-peer model, on a stand-alone computing device, or in accordance with a distributed computing model, in which the various functionalities described herein may be implemented or employed at different locations.

Figure 3:
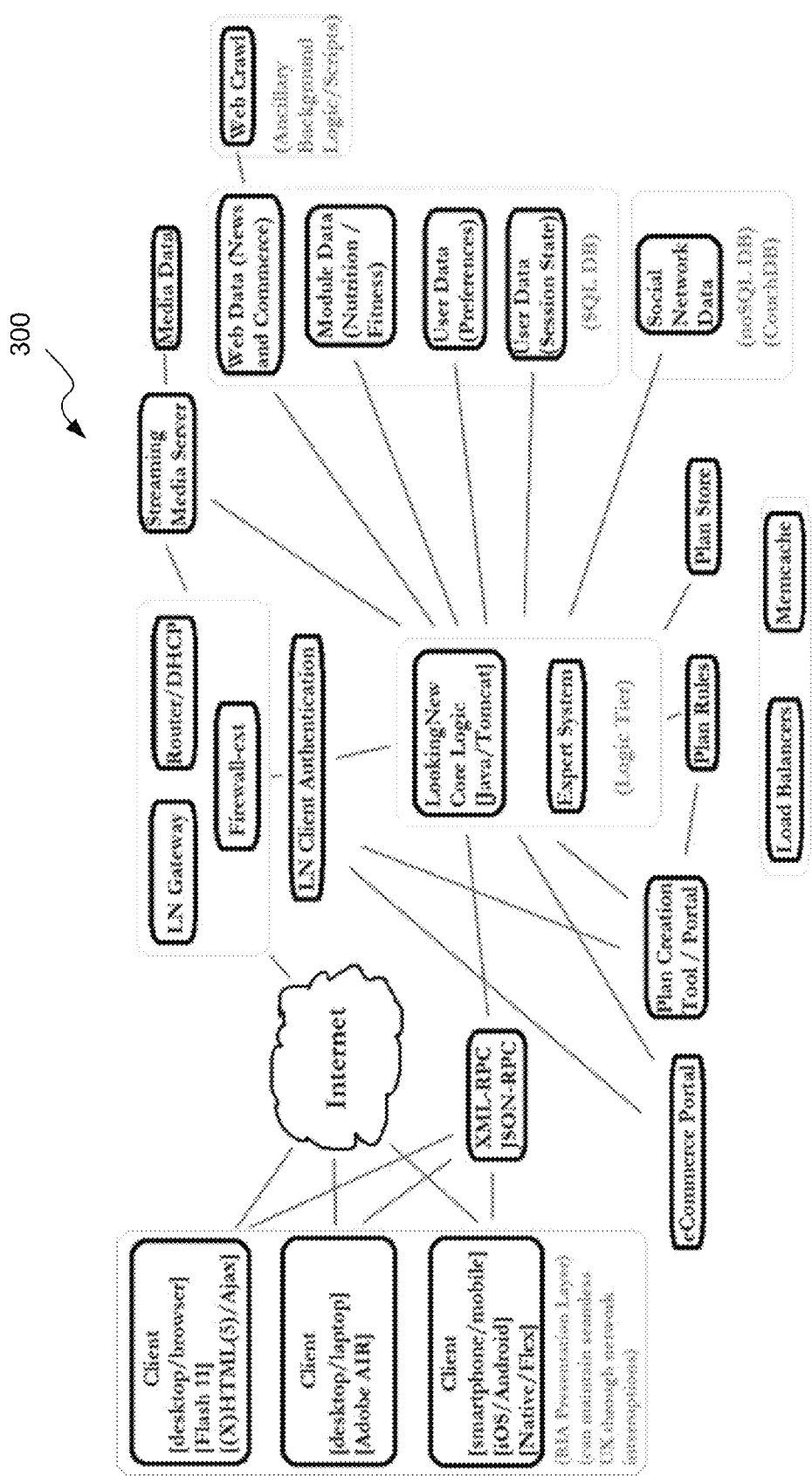
FIG. 3 illustrates architecture of the computer system for generating customized user plans based on the one or more creator plans, in accordance with certain embodiments.

A brief example of system architecture is now presented to provide some context for the various operations described below. FIG. 3 illustrates the architecture 300 of a computer system for generating the customized user plan based on the one or more creator plans, in accordance with certain embodiments. The left-hand part of the diagram illustrates the various types of clients, such as browsers provided on desktops and smartphones, as well as the various software applications provided on the client. These clients are connected using the Internet and various protocols to various input/output modules of the plan integrator/processor/expert system 104, which includes the core logic, portals, rules, and other modules. The plan integrator/processor/expert system 104 may also include a plan store module. The right-hand part of the diagram illustrates various types of data processed by the plan integrator/processor/expert system 104. Some examples include, but are not limited to, web data, module data, user data, and social network data.

Figure 4:
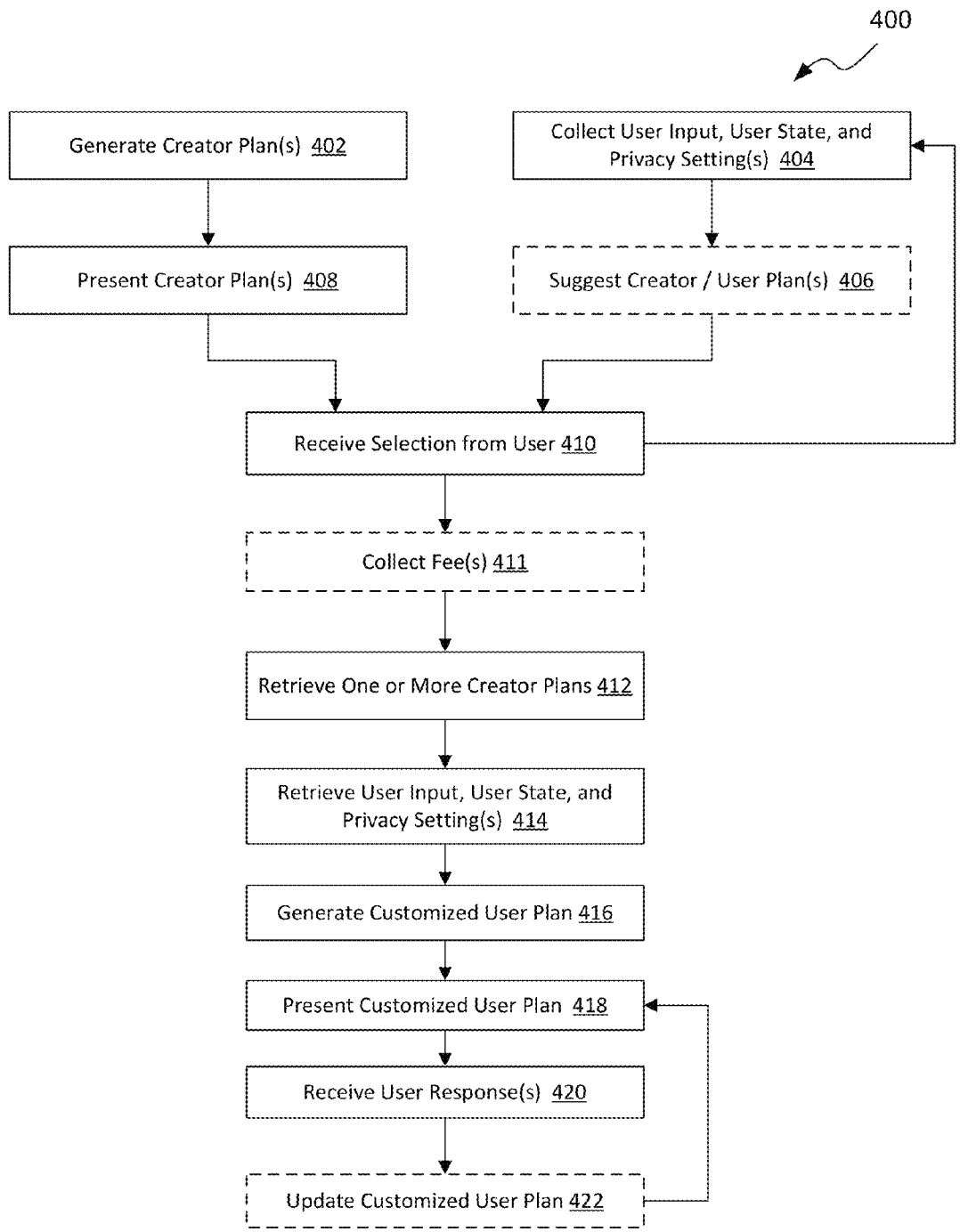
FIG. 4 is a process flowchart corresponding to the computer-implemented method for customized user plans based on the one or more creator plans, in accordance with certain embodiments.

FIG. 4 is a process flowchart corresponding to computer-implemented method 400, in accordance with certain embodiments. The method 400 may involve generating the one or more creator plans at operation 402. At this operation, the one or more plan creators input various data into the system (for example, using the plan creation tool). As stated above, the plan creation tool may be available as an online web-based application or a downloadable application. The plan creator may access such an application and input various data. Examples of such data may include various instructions for users to follow, criteria for selecting and modifying the instructions based on data of different users and other types of data, description of the plan, disclaimers and notices, information about the plan creator, and other data. Some of this data may be suggested by the system. In certain embodiments, the plan creator may use one of the existing plans or templates as a starting point and then modify it as appropriate.

Part of the plan creation operation may be setting up usage fees for the plan, linking the plan to promotional materials, and using other ways of generating monetary compensation for the plan creator. In certain embodiments, the system sets the fee payable to the plan creator based on popularity, success, and other criteria associated with the plan.

A system may have one or more default user profiles (e.g., the most typical profile) for the testing of the creator plans. Furthermore, the system may have an engine capable of predicting whether the plan will be successful based, for example, on the feedback and history of the other plans that have been available from the system over a period of time.

In certain embodiments, depending on specific system settings, the one or more prediction results may be made available to the plan user, or one or more other users of the system, including the designated system user with appropriate clearance, the plan chooser, or the plan creator. The information regarding the probabilities of success of the particular creator plan may be computed and presented dynamically by the system's engine logic, i.e. all changes to one or more types of data/inputs that the creator plan is based on may automatically be taken into account by the system, with the creator plan being modified accordingly. The information concerning the probabilities of success of the creator plan that is made available to the user, the designated system user with relevant clearance, plan chooser, or plan creator may include details as to which of the parameters of the creator plan are causative of the lowered or raised chances of the user's success. In this or other embodiments, the success of the prediction logic may be utilized to evaluate the probabilities of the success of the resulting plan when several creator plans are combined and integrated. For example, if a "pork diet" is combined with a "kosher diet", or a "vegan diet" is combined with the "Atkins diet", the probability of success would be very low.

The one or more creator plans may be stored in the database of the system and may be available for presenting them to the users of the system. Access to the creator plans may be unrestricted or restricted. For example, the plan creators or the system may set a fee for the use of some of the selected plans. The plans may be also restricted based on various demographic aspects, such as age, gender, and geographic location. In certain embodiments, these restrictions may be used by the plan creators or by the system to determine the efficiency of the plan for a specific user group and to conduct various studies, similar to the clinical studies that differentiate patients.

In certain embodiments, multiple plans generated through the same or different systems may be available from the plan store. The plan store may be arranged and function similarly to the App Store or Android Market Place. Specifically, the creator plans may be categorized and ranked based on their type (e.g., health or financial), availability (e.g., free, fee-based), popularity (e.g., number of uses), success (e.g., the number of users who have achieved their goals), ease of use, and other factors. In certain embodiments, the creator plans may be categorized by the likelihood of success for a particular user, which is determined based on the available information concerning the user, such as the user age, health-related characteristics, and so forth. The plan store may be used for leaving comments, taking part in rankings, or for receiving other feedback from the plan users 120. At some point in the process, the one or more plans may be presented to the user at operation 408. The plans may be browsed or searched for in a database of the system, or elsewhere (for example, in the plan store described above). Additionally, the plans may be searched for or selected in other locations in the application as well. Users may find the creator plans based on some key terms, plan creator identifications, and other indicators. In certain embodiments, the one or more creator plans or user plans may be suggested to the user by the system as shown by an optional operation 406. Such a suggestion may be based on various user data collected during the previous operations. For example, the user may first provide the user input, user state, and privacy settings to the system at operation 404. The user data may appear to be already available in the system due to the previous interactions of the user with the system. For example, some of the data may be accumulated during the user's acquisition and execution of previous plans. In certain embodiments, a new plan may be suggested to the user based on the completion of some previous plan, as further described below. In certain embodiments, the user input, user state, and privacy settings are collected using the set-up wizard, as explained above with reference to FIG. 1.

If any data on the user is stored in the system, the creator plans may be presented (at operation 408) or suggested (at operation 406) to the user in a partially or fully adopted format. In the fully adopted format, the creator plan may be the same as the user's plan. The fully or partially adopted plan may be easier to review and understand, as well as appear more appealing to the user than the generic creator plan.

At some point, the system may receive a selection of the one or more plans from the user at operation 410. The selection may involve adding the one or more plans to the user's shopping cart or account. During the selection process, the user may be presented with various legal disclaimers (e.g., instructing the user to consult his or her physician prior to using the plan), notifications, requests for additional information, and other types of data exchange with the system.

If any of the selected plans involve payment, the method 400 may proceed with collecting the fees from the user at optional operation 411. The user may be prompted to enter some payment information (e.g., credit card information, online payment service information). In certain embodiments, the user may be offered an option to reduce or, in more specific embodiments, eliminate the fees by subscribing to various promotions. For example, the user may choose a weight loss plan that includes exercise and dieting. The fee for the plan may be reduced if the user subscribes to a gym membership, agrees to purchase certain diet food items from a selected source, or agrees to participate in some other promotional activities. In certain embodiments, the user may receive a promotional code for a free-of-charge or discounted purchase of the one or more creator plans or for a free-of-charge or a discounted subscription to the one or more creator plans. The offer may be made through a mailing or emailing campaigns, or through an existing membership channels. In certain embodiments, the right to a free-of-charge or discounted subscriptions may be granted in the form of promotional discount coupons that may be distributed, for example, to hospital patients enabling them to join a diabetes plan free-of-charge or at a discounted price.

The method 400 may involve retrieving the one or more creator plans at operation 412. This operation is typically based on user selection of the one or more creator plans at operation 410. However, user data or external input may be used in addition to or even instead of the user selection for retrieving the one or more creator plans. For example, the creator plan presented to and selected by the user may have various levels of complexity. Certain data associated with this user may indicate that the user prefers simpler approaches to his or her plans. As a result of this preference reflected in the user data, a simpler version of the plan may be retrieved. In certain embodiments, some external data may impact this retrieval operation. For example, a weight loss plan initially selected by the user may include instructions for outdoor activities, such as jogging. At the same time, the weather report (i.e., the external data) may indicate conditions (e.g., rain) that may prevent the user from following this plan precisely. In this situation, the weather report may be relied upon to modify the existing weight loss plan to refocus mostly on indoor activities. The user data used to retrieve the plan may be available in the system or collected from various external sources. For example, friends of the user may discuss the user's depressed state on a social networking site. These conversations may be analyzed by the system to update the user data and retrieve a plan intended for overcoming depression. The user may be asked to select any such plan from the system. The plan may also be retrieved based on a recommendation, or even be a gift from another user of the system.

In order to create the customized user plan based on the one or more creator plans retrieved at operation 412, the process first retrieves the user input, user state, and privacy settings at operation 414. The various examples of these parameters are presented and explained above. In certain embodiments, operation 414 also involves retrieving the external data, plans of other users or user groups, and other types of data, as was described above with reference to FIG. 1.

At operation 416, the method 400 may then proceed with generating the user plan based on integration of the one or more creator plans with the user input, user state, and privacy settings associated with the user. In certain embodiments, the plan may be generated based on the external data or other user data in addition to other data mentioned above. Various examples of the external data and other user data are described above. In the same or other embodiments, multiple creator plans may be integrated with the user data to generate a single user plan. At operation 418, the generated user plan is presented to the user.

The method 400 may proceed with receiving one or more responses from the user at operation 420. The responses may concern completion (or not) of the one or more instructions provided in the user plan. The system may prompt the user to submit such responses, for example, by sending various notifications (e.g., e-mails or text messages).

The method 400 may also involve updating the user plan at optional operation 422. The updates may be based on the one or more responses received from the user at operation 420, or based on changes to the user input, user state, and privacy settings associated with the user. Once the updates are performed, the updated user plan is presented to the user.

Figure 5:
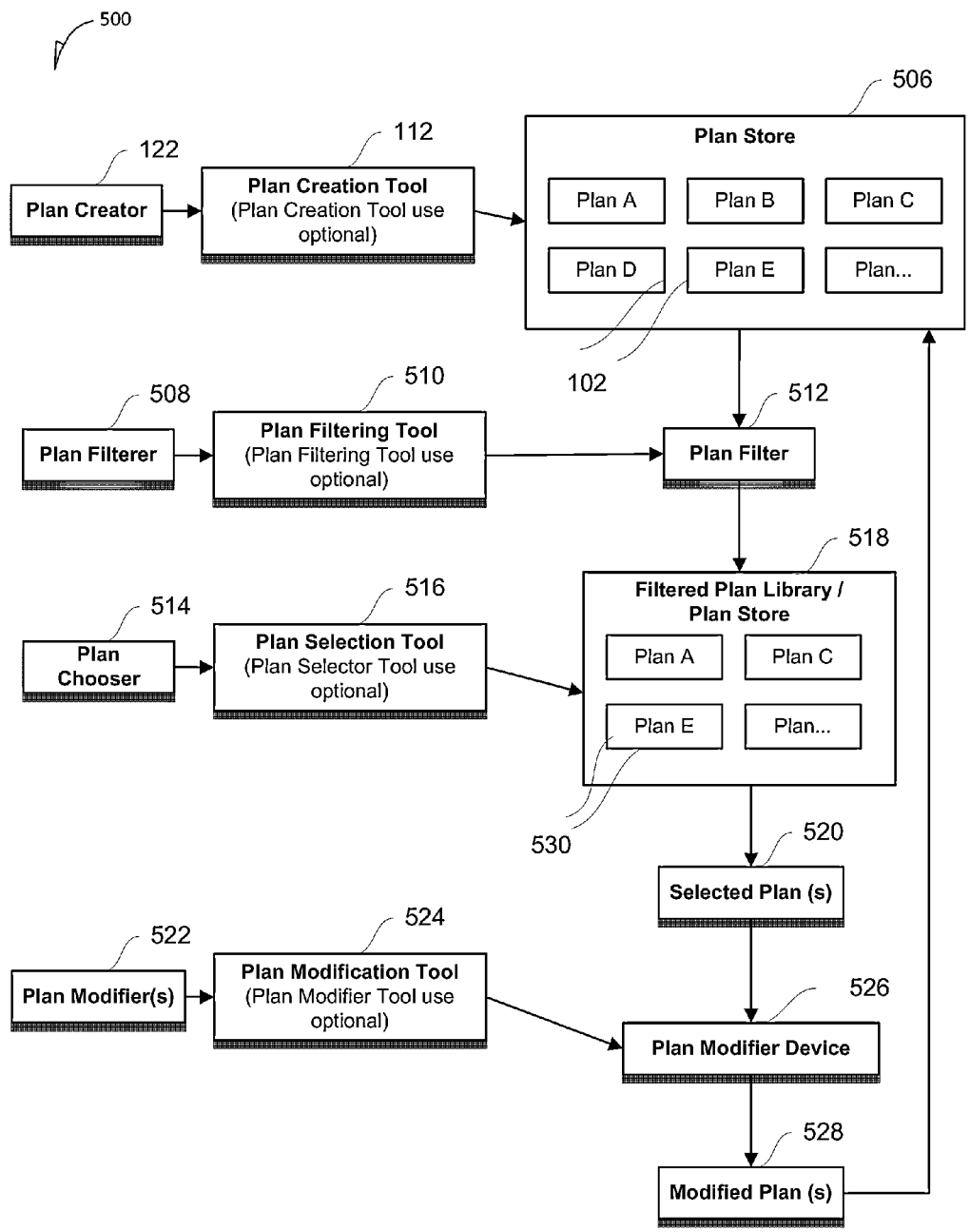
FIG. 5 illustrates plan creation and selection-related processes employed by the system in generating customized user plans based on the one or more creator plans, in accordance with certain embodiments.

FIG. 5 illustrates plan creation and selection-related processes employed by the system in generating customized user plans based on the one or more creator plans, in accordance with certain embodiments. The creator plans 102 may be created by the plan creators 122 using the plan creation tool 112 and uploaded to the plan store 506. The one or more creator plans 102 may then be filtered by the plan filterer 508 using the plan filter 512 or plan filtering tool 510, and stored in a filtered plan library store 518, from which the creator plans 102 may be retrieved by the plan chooser 514 using the plan selection tool 516. The one or more creator plans that have been filtered by 530 may be selected and retrieved from the filtered plan library/plan store 518 by the plan chooser 514 using the plan selection tool 516. The one or more creator plans that have been selected may be modified by the one or more plan modifiers 522 using the plan modifier device 526 or plan modification tool 524. The one or more creator plans that have been modified at 528 may subsequently be uploaded to the plan store 506.

Figure 6:
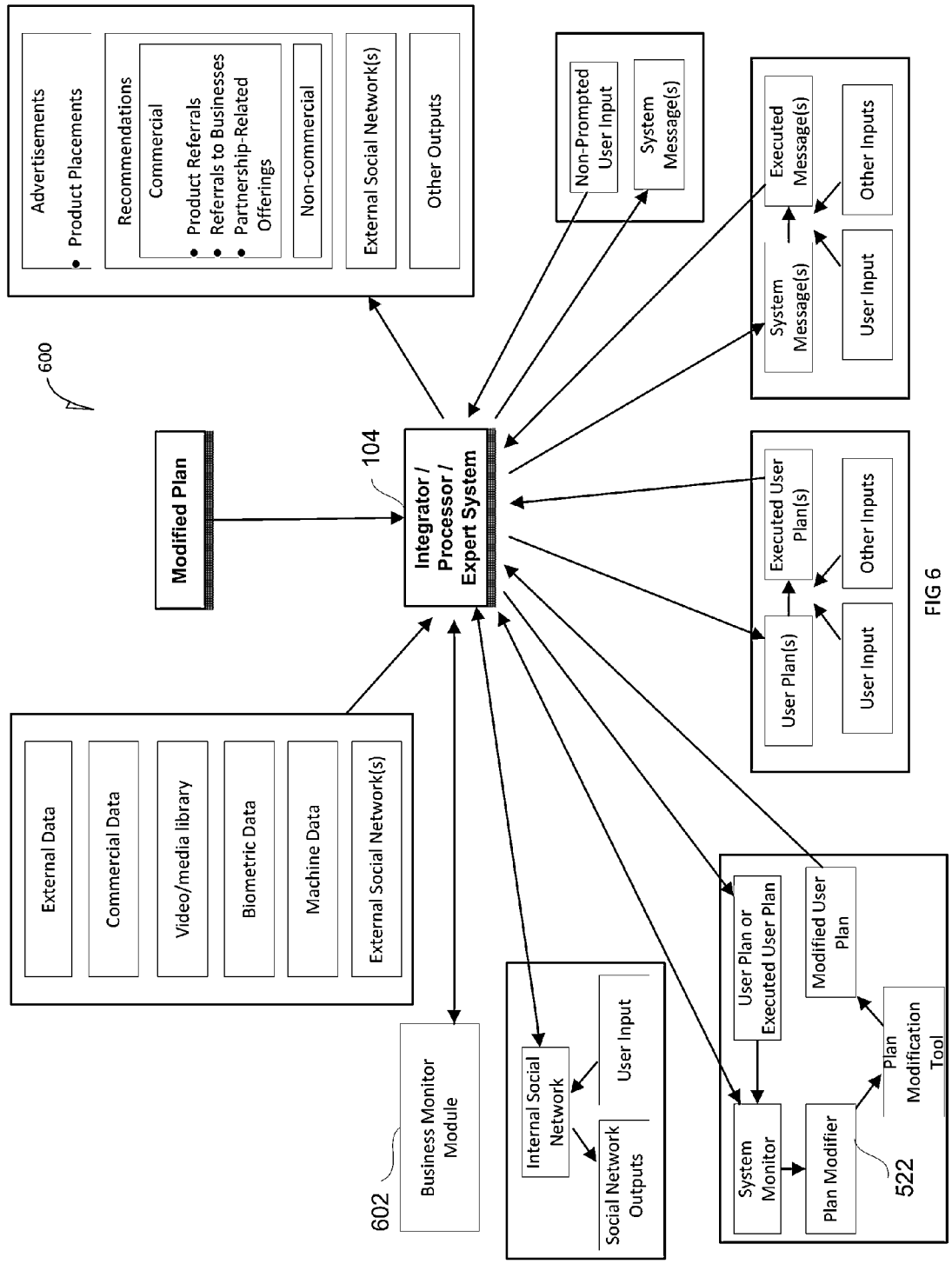
FIG. 6 illustrates various aspects associated with processing of data by the system for generating customized user plans based on the one or more creator plans, in accordance with certain embodiments.

FIG. 6 illustrates various aspects associated with processing of data by the system for generating customized user plans based on the one or more creator plans 102, in accordance with certain embodiments. The integrator/processor/expert system 104 receives various inputs from a number of the input sources. The data that is submitted into the system may include external data, commercial data, internal data, the inputs retrieved from the video/media library, biometric data, machine data, data from external social networks, and so forth. In certain embodiments, the input sources may comprise the internal social network (the input is user input processed by the internal social network), the system monitor (the input is a modified user plan or executed customized user plan), the plan user 120 (the input is a plan user-modified creator plan, or an executed customized user plan), and executed system messages that are used as plan user inputs. The business monitor module 602 that may or may not be part of the plan integrator/processor 104 may be used to track the usage of the system data by various commercial entities. Specifically, the business monitor module 602 may utilize data associated with various commercial entities to track commercial transactions, thereby enabling calculation and charging of a percentage of profits or a fee. For example, the business monitor module 602 may be used to process commercial data associated with the product placements, product referrals, referrals to businesses, and partnerships-related commercial opportunities. The system may be able to generate and export reports, exchange messages with external systems, including the external social networks, and so forth. The embodiment wherein the system for generating customized user plans based on the one or more creator plans includes the business monitor module 602 may be the best-mode-embodiment.

Figure 7:
FIG. 7 illustrates a user welcome screen informing the user of plan availability and suggesting viewing the daily plan, in accordance with certain embodiments.

Some examples of generating graphical user interfaces by the plan integrator/processor/expert system 104 will now be briefly described. FIG. 7 illustrates a user welcome screen informing the user of the plan's availability and suggesting that the user view the daily plan, in accordance with certain embodiments. The daily plan may be a subset of a more comprehensive, date-specific user plan. In certain embodiments, the daily plan or the entire user plan may be integrated with the user's other applications, such as, for example, with his or her calendar and task list.

Figure 8:
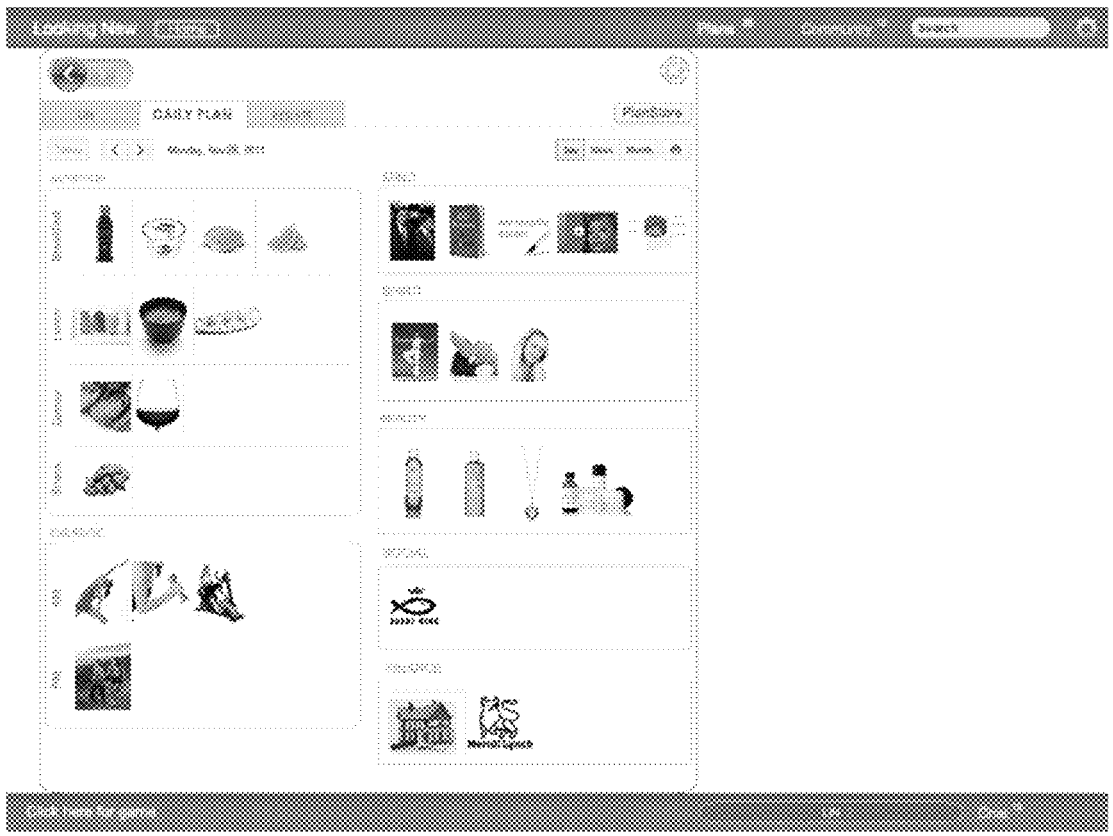
FIG. 8 illustrates a user daily plan, showing various categories and tasks in this plan, in accordance with certain embodiments.

FIG. 8 illustrates the user daily plan, showing various categories and tasks that this plan may contain, in accordance with certain embodiments. In the described embodiment, the user daily plan includes a nutritional category, exercise category, mind category, spirit category, beauty category, social category, and financial category. The tasks within each category are represented by corresponding images. In the same or other embodiments, the one or more tasks may be described using text.

Figure 9:
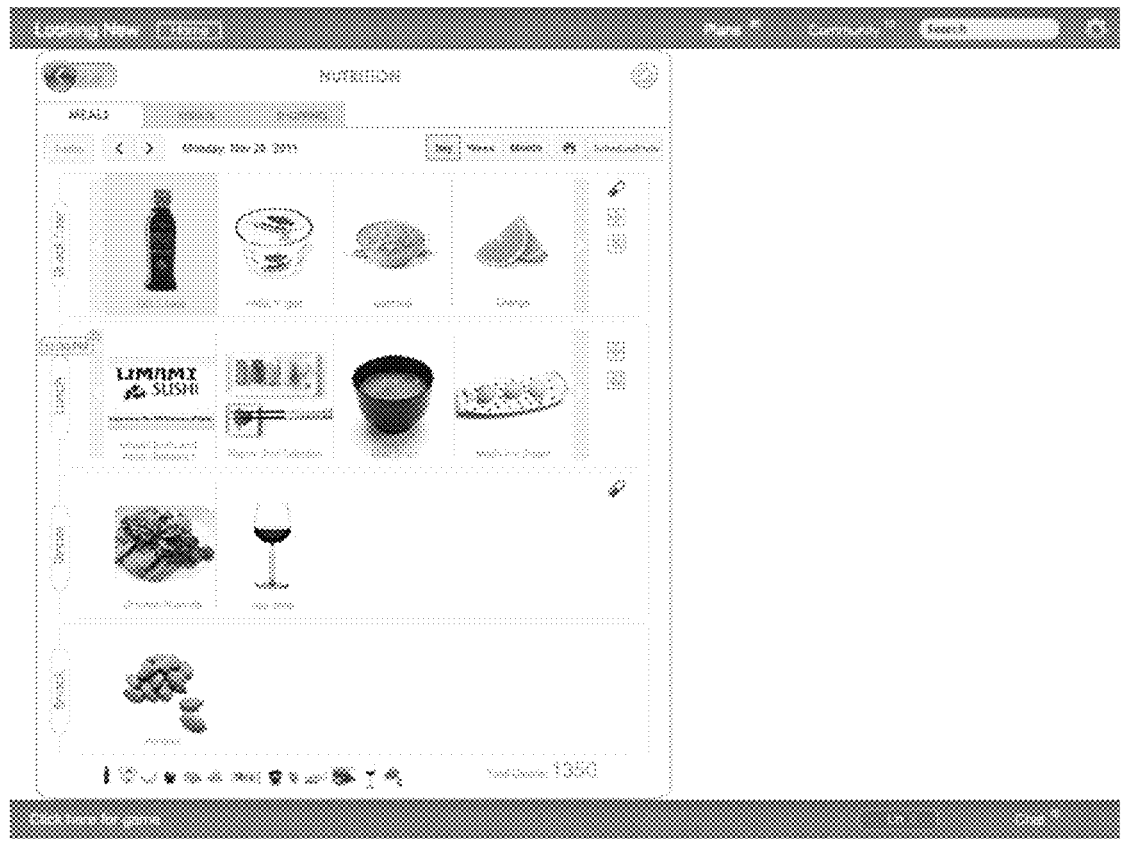
FIG. 9. Illustrates a user interface intended for a detailed preview of a nutrition category, in accordance with certain embodiments.

When the user selects the nutritional category, he or she may be taken to the user interface dedicated to this category, as shown in FIG. 9. This interface shows different meals and calls out specific food items for each meal. The user may view the details of a food item by activating the corresponding field. For example, the user may view the nutritional facts of any of the food items, reviews of the item, alternatives to the item, and more. Some of the items may be identified as promotional items, which are provided by retailers that will pay for the inclusion of such items in the plan when users select these items. The nutritional category may be also used to explore various restaurant venues (e.g., to access their menus, order take-out, get familiar with nutritional facts, view feedback, and so forth). The menu items from these restaurants may be added to the daily plan of the user. The same category may also allow viewing the current results in achieving the goal and, in certain embodiments, the projected results based on the current plan. Furthermore, the category may be used to generate shopping lists and recipes based on the selection of the food items in the plan.

In certain embodiments, the related commercialization opportunities may include promotional coupons that allow plan users to receive the presented items at a discounted price, as well as various product placements, product referrals, referrals to businesses, such as for example, real-estate agents, restaurants, stores, car repair shop, and so forth. Products and services may be offered to plan users as a result of partnerships with manufacturers, service providers, or other vendors, which may also be featured in the creator plans, for example, as recommended by the vendors.

The application will dynamically choose the best or most appropriate commercial recommendations or referrals for the user based upon a number of different criteria, which may include, but not be limited to, user data, user preferences, external data such as the value of the product or the value of the sale to the company, computed characteristics, and so forth and will be computed by an algorithm within the application.

A similar interface may be used for other categories. The interface may allow for an interactive dialog with the user based on his or her previous inputs. For example, one of the user inputs may be located and used to determine why the user favors one food item over another. This change or response may be recorded as one of the preferences in the user data.

Figure 10:
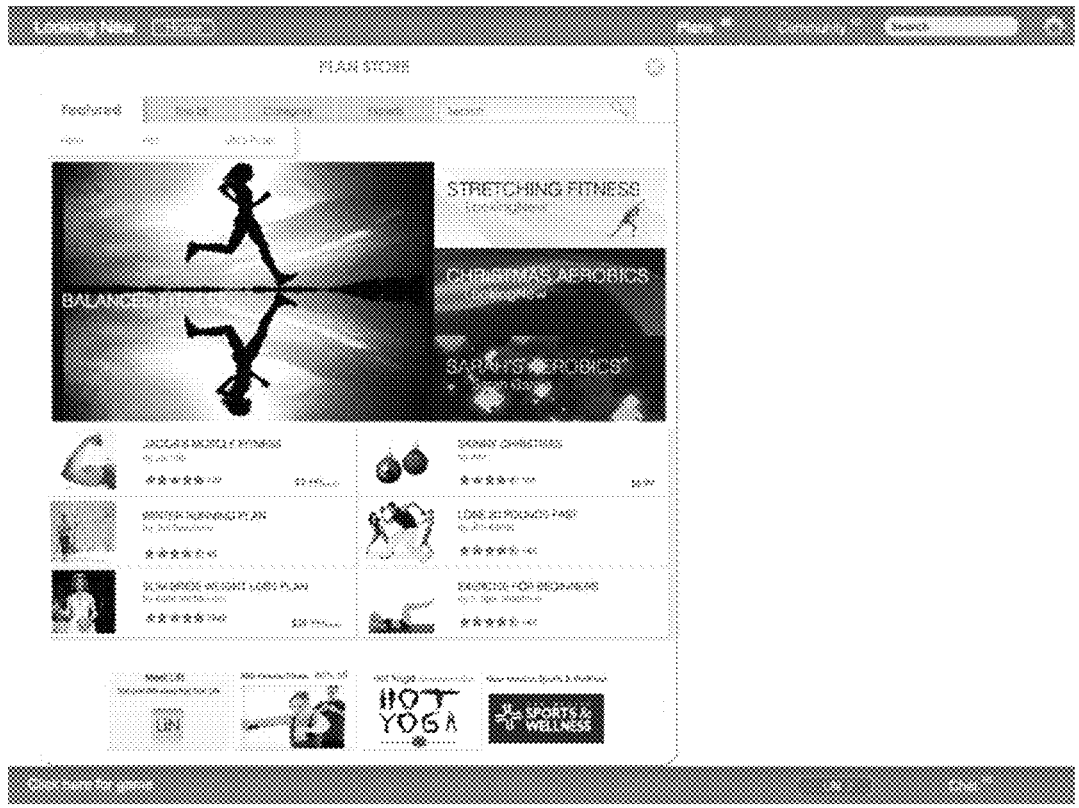
FIG. 10 illustrates a plan store welcome screen, informing the user of various creator plans available for the user to adopt and generate customized user plans, in accordance with certain embodiments.

FIG. 10 illustrates the plan store welcome screen informing the user about the various creator plans available for the user to adopt and use to generate the customized user plans, in accordance with certain embodiments. The creator plans may be categorized according to one or more categories (e.g., categories listed above for the daily plan example and shown in FIG. 8). The creator plans may also be categorized based on the expert (e.g., nutritionist, aerobics instructor, personal trainer, herbalist, and exercise physiologist), probability of the creator plans' success with respect to a particular user, the selection of the creator plans used by users of a social network who are connected to this plan user, and can be based on various other parameters.

Figure 11:
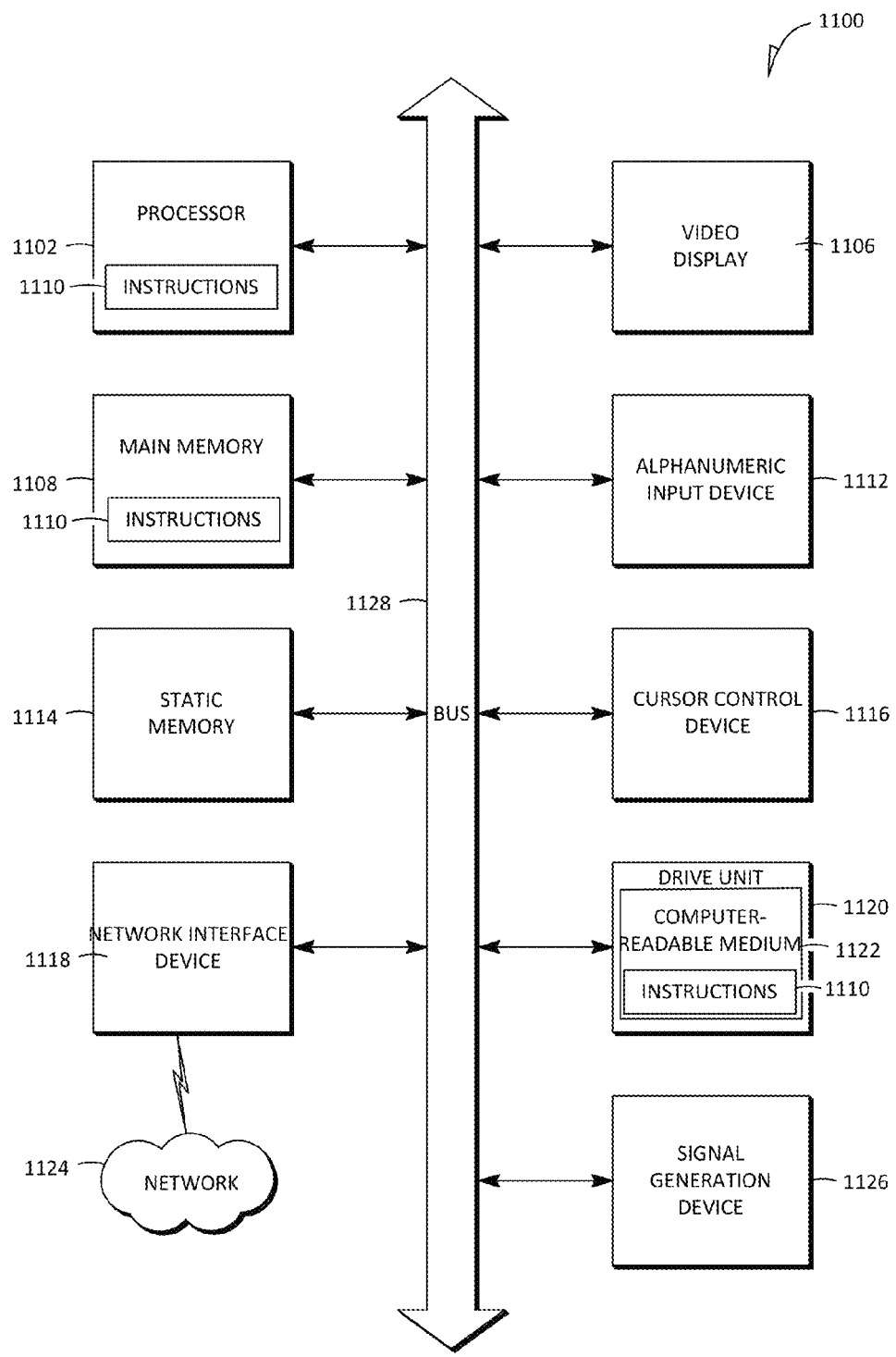
FIG. 11 is a diagrammatic representation of an example machine in the form of a computer system, within which a set of instructions for causing the machine to perform any one or more of the methodologies discussed herein is executed.

FIG. 11 is a diagrammatic representation of an example machine in the form of a computer system 1100, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor or multiple processors 1102 (e.g., a central processing unit (CPU), a graphics processing unit (GPU), or both), and a main memory 1108 and static memory 1114, which communicate with each other via a bus 1128. The computer system 1100 may further include a video display unit 1106 (e.g., a liquid crystal display (LCD)). The computer system 1100 may also include an alphanumeric input device 1112 (e.g., a keyboard), a cursor control device 1116 (e.g., a mouse), a voice recognition or biometric verification unit (not shown), a disk drive unit 1120, a signal generation device 1126 (e.g., a speaker) and a network interface device 1118. The computer system 1100 may further include a data encryption module (not shown) to encrypt data.

The disk drive unit 1120 includes a computer-readable medium 1122 on which is stored one or more sets of instructions and data structures (e.g., instructions 1110) embodying or utilizing any one or more of the methodologies or functions described herein. The instructions 1110 may also reside, completely or at least partially, within the main memory 1108 or within the processors 1102 during their execution by the computer system 1100. The main memory 1108 and the processors 1102 may also constitute machine-readable media.

The instructions 1110 may further be transmitted or received over a network 1124 via the network interface device 1118 utilizing any one of a number of well-known transfer protocols (e.g., Hyper Text Transfer Protocol (HTTP)).

While the computer-readable medium 1122 is shown in an example embodiment to be a single medium, the term "computer-readable medium" should be taken to include a single medium or multiple media (e.g., a centralized or distributed database or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like.

The example embodiments described herein may be implemented in an operating environment comprising software installed on a computer, in hardware, or in a combination of software and hardware.

Although the embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

We claim:

1. A computer-implemented method for generating customized user plans based on one or more creator plans, the computer-implemented method comprising the following steps performed by a processor:

receiving the creator plans from plan creators, wherein the creator plans are configured to be generated by the plan creators and updated by the plan creators;

filtering the creator plans based on user-generated criteria;

retrieving a first creator plan of the one or more creator plans based on a selection of the first creator plan by a user, the selection by the user comprising at least one of a selection of the one or more creator plans by the user, a selection of the one or more creator plans by another system's user different from the plan creators, or a selection of the one or more creator plans by a software application based on external input and user data of the user;

retrieving user input, the user input including a user state associated with a second user able to perform an action associated with a customized user plan;

generating the customized user plan based on integration of the selected first creator plan with the user input, wherein the customized user plan comprises a set of instructions for execution by the second user, wherein the set of instructions includes the action;

providing the customized user plan to the user or the second user;

receiving one or more responses from the user or the second user about completing one or more instructions of the set of instructions, the one or more responses including at least an indication of whether the second user has performed the action associated with the set of instructions;

updating the customized user plan based at least in part on plan modification information received from a first plan creator of the plan creators, the customized user plan updated to implement the customized user plan based at least in part on the one or more responses and the received plan modification information, the first plan creator corresponding to the selected first creator plan utilized to generate the customized user plan;

providing the updated customized user plan to the user or the second user; and monitoring fulfillment of the updated customized user plan.

2. The computer-implemented method of claim 1, wherein the one or more responses received from the user or the second user include at least information associated with the user input, the user state, or privacy settings associated with the second user.

3. The computer-implemented method of claim 1, wherein the customized user plan is generated based on the external input in addition to at least one of the user input, the user state, privacy settings associated with the second user, a relationship of another user, a relationship of a user group associated with the second user, success in implementing the one or more creator plans created by one or more other users, or one or more related plans.

4. The computer-implemented method of claim 3, wherein the external input comprises at least one of past facts, present facts, measurements, observations, statistics, opinions, current events, past events, potential future events, current notifications, past notifications, potential future notifications, processed data, data incorporated in a database, commercial data, advertisements, product placements, weather data, a government health database of food nutrition, a current mortgage interest rate, a local venue or activity, nutritional studies, nutritional data, fitness activities, spiritual activities, gatherings of individuals, gathering of groups, educational opportunities, or financial data.

5. The computer-implemented method of claim 1, further comprising enabling generation of the one or more creator plans based on input from the plan creators.

6. The computer-implemented method of claim 1, wherein the creator plans are filtered using a plan filtering tool.

7. The computer-implemented method of claim 1, wherein the filtered creator plans are chosen using a plan selection tool.

8. The computer-implemented method of claim 1, further comprising collecting a fee from the user or the second user based on the user selection or the second user selection of the one or more creator plans.

9. The computer-implemented method of claim 1, further comprising presenting multiple creator plans to the user or the second user and receiving the selection of the one or more creator plans by the user or the second user, wherein presenting the multiple creator plans comprises presenting one or more evaluations or comments corresponding to the multiple creator plans.

10. The computer-implemented method of claim 1, further comprising presenting the one or more creator plans to the user based on the user data or the external input.

11. The computer-implemented method of claim 1, wherein generating the customized user plan comprises integrating multiple creator plans with the user input, the user state, and privacy settings associated with the second user.

12. The computer-implemented method of claim 1, further comprising collecting the user input, the user state, and privacy settings associated with the user.

13. The computer-implemented method of claim 1, further comprising monitoring, modifying, or cancelling the generated customized user plan.

14. The computer-implemented method of claim 13, wherein the first creator plan or the customized user plan is modified using a plan modification tool.

15. The computer-implemented method of claim 13, wherein the customized user plan is presented to the user via a plan presentation module.

16. The computer-implemented method of claim 1, further comprising:
receiving information related to one or more associated businesses; and
selectively displaying one or more business referrals or product placements associated with the one more businesses within the customized user plan.

17. The computer-implemented method of claim 1, further comprising:
receiving one or more promotions associated with one or more good or service from one or more associated businesses; and
selectively displaying the one or more promotions within the customized user plan, the one or more promotions allowing the user or the second user to receive the one or more good or service at a promotional price.

18. The computer-implemented method of claim 1, wherein the fulfillment of the one or more customized user plans is monitored using a plan monitoring module.

19. The computer-implemented method of claim 1, wherein a designated system operator with appropriate clearance is enabled to instruct the system to generate a message and send it to another system user or external recipient, thereby informing the another system user or the external recipient of the message about, or requesting the another system user or the external recipient to take some action with regards to an event or situation associated with the customized user plan.

20. The computer-implemented method of claim 1, wherein the one or more creator plans are chosen and allocated to the second user or a user group by the user, the user being a plan selector with clearance.

21. The computer-implemented method of claim 1, wherein the one or more creator plans is chosen by the second user, or is chosen for the second user or a user group by another user of the system or by the software application, and is approved by the user.

22. The computer-implemented method of claim 1, wherein the customized user plan contains links to, or is associated with, media of different types or other digital content; and
wherein the customized user plan contains links to web resources that provide content relevant to customized user plan.

23. The computer-implemented method of claim 1, wherein success of the customized user plan for a particular user is calculated based on user-related data and dynamically recalculated to take into account changes to one or more types of inputs that were used in creating the customized user plan.

24. The computer-implemented method of claim 23, further comprising calculating a probability of success for the particular user of the customized user plan.

25. The computer-implemented method of claim 1, further comprising charging commercial entities for using data associated with product placements, product referrals, referrals to businesses, or partnerships-related commercial opportunities.

26. A computer-implemented system for generating a customized user plan based on one or more creator plans or combination or integration of more than one creator plans, the system comprising:
a processor configured to:
receive the creator plans, wherein the creator plans are configured to be generated by plan creators and updated by the plan creators;
filter the creator plans based on user-generated criteria received from a user or a plan administrator;
retrieve a first creator plan of the creator plans based on a selection of the first creator plan by the user, the selection by the user comprising at least one of a selection of the one or more creator plans by the user, a selection of the one or more creator plans based at least in part on user data of the user, or a selection of the one or more creator plans based at least in part on external input;
generate a customized user plan based on integration of the selected first creator plan with user input associated with a second user capable of performing an action associated with the customized user plan, wherein the customized user plan comprises a set of instructions for execution by the second user, wherein the set of instructions includes the action;
receive a response from the user or the second user about completing one or more instructions of the set of instructions, the response including at least an indication of whether the second user has performed the action associated with the set of instructions;
update the customized user plan based at least in part on plan modification information received from a first plan creator of the plan creators, the customized user plan updated to implement the customized user plan based at least in part on the response and the received plan modification information;
provide the updated customized user plan to the user or the second user; and
monitor fulfillment of the updated customized user plan.

27. The system of claim 26, wherein one or more designated system users with clearance cancel implementation of the customized user plan, or approve the one or more creator plans allocated to the second user, or allocated to a specific user group by another system user.

28. The system of claim 26, wherein the processor is further configured to charge commercial entities for using data associated with at least one of a product placement, a product referral, a referral to a business, or a partnership-related commercial opportunity.

29. A non-transitory machine-readable medium comprising instructions, which when implemented by one or more processors, perform the following operations:

receiving creator plans from plan creators, wherein the creator plans are configured to be generated and updated by the plan creators;

filtering the creator plans based on user-generated criteria;

retrieving a first creator plan of the one or more creator plans based on a selection by a user, the selection by the user comprising at least one of a user selection of the one or more creator plans by the user, a selection of the one or more creator plans by another system user, or selection of the one or more creator plans by a software application based on user data and external input;

retrieving user input from a second user, the user input including a user state associated with the second user;

generating a customized user plan based on integration of the selected first creator plan with the user input, wherein the customized user plan comprises a set of instructions for execution by the second user;

providing the customized user plan to the user or the second user;

receiving one or more responses from the user or the second user about completing one or more of the instructions of the set of instructions, the one or more responses including at least an indication of whether the second user has performed an action associated with the one or more instructions of the set of instructions;

updating the customized user plan based at least in part on plan modification information received from a first plan creator of the plan creators, the customized user plan updated to implement the customized user plan based at least in part on the one or more responses and the received plan modification information, the first plan creator corresponding to the selected first creator plan utilized to generate the customized user plan; and providing the updated customized user plan to the user or the second user.

* * * * *